Oct. 23, 1956  A. A. TENNANT  2,767,661
MEANS FOR THE TRANSPORTATION AND STORAGE OF GOODS
Filed Feb. 15, 1956  2 Sheets-Sheet 1

INVENTOR.
ALEX A. TENNANT,
BY
Mason & Mason
Attorneys.

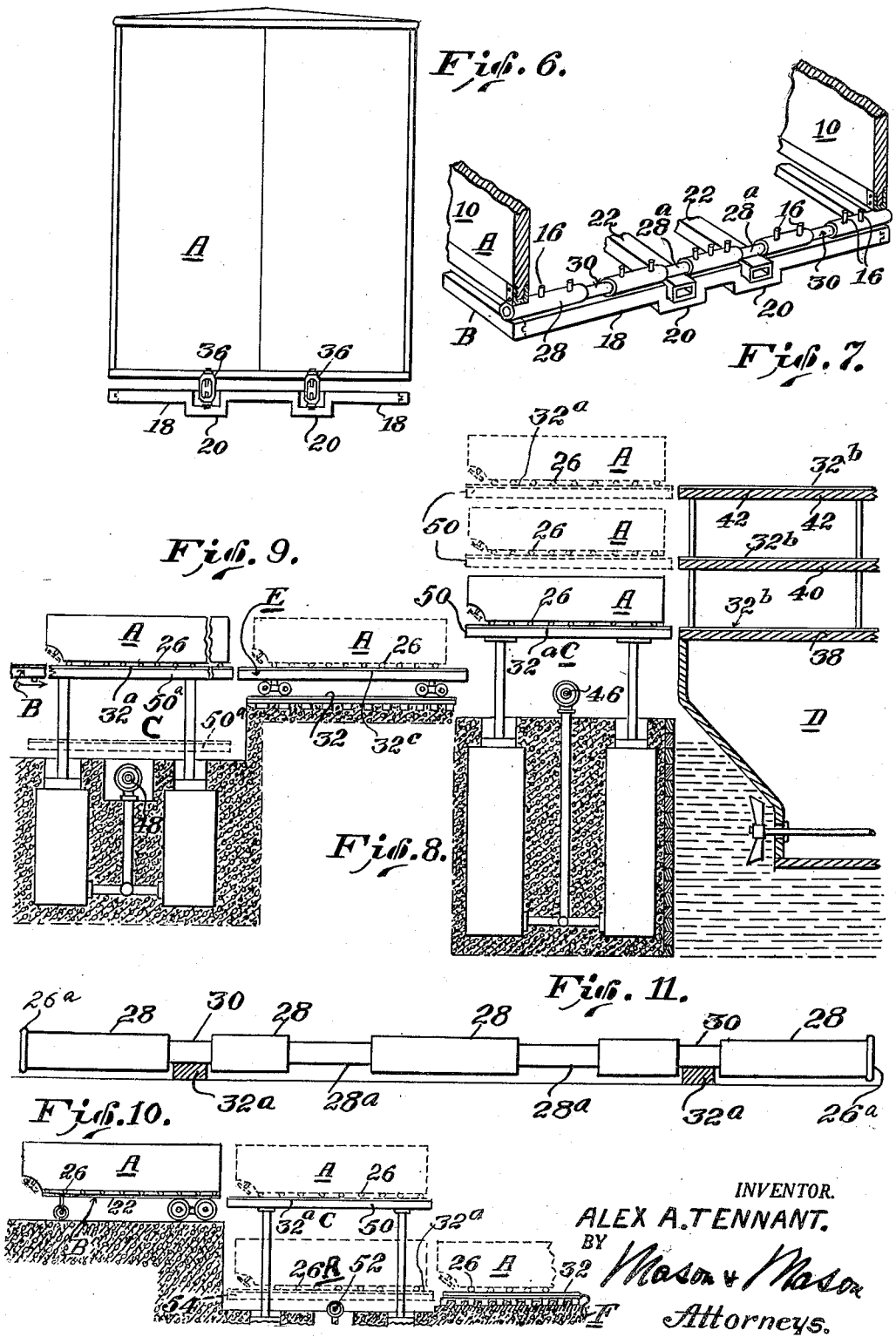

United States Patent Office 2,767,661
Patented Oct. 23, 1956

2,767,661

MEANS FOR THE TRANSPORTATION AND STORAGE OF GOODS

Alex A. Tennant, Washington, D. C.

Application February 15, 1956, Serial No. 565,685

9 Claims. (Cl. 104—48)

This invention relates to a means for the transportation and storage of goods by means of one of the following transporting means, viz., trucks, railway cars, elevators, ships, planes, which goods are transferred from one to the other or to a warehouse or other place of storage, or from said place of storage to one or more of said transporting means.

This application is a continuation-in-part of my application Serial No. 471,252, filed November 26, 1954, for Method and Means for Transporting Goods, now abandoned.

One of the principal objects of the invention is to reduce the costs of transportation, and especially the costs of distribution of commodities of all classifications that are transportable by trucks, truck-trailer vans, either as a unit or sectionalized, railway cars, ships and planes; and to substantially reduce or entirely eliminate the loss of revenue "earning time" of the aforesaid means of transportation. The means of this invention is particularly applicable to the transportation of military equipment.

Another object of the invention is to provide a ready means for rapidly and economically loading and unloading motorized trucks and truck-trailer vans, that is, those portions which carry the goods, whereby the latter may be moved from said truck or truck-trailers onto flat railway cars, ships, especially roll-on-roll-off type of ships, and other floating craft and commercial and military aircraft, and whereby such truck or truck-trailer body may be moved from one means of transportation to another means of transportation, or to storage, on a substantially horizontal plane.

A further object of the invention is to provide a body or van, either as a unit or in sections, that will utilize a minimum of height during transportation to thereby provide a maximum load, or accommodate a maximum cubic foot of storage with a minimum of height.

Yet another object of the invention is to provide a system of transportation which will permit the quick loading of freight-carrying ships or barges and wherein a maximum number of load-carrying bodies may be accommodated by said ship or barge.

Other objects will appear hereinafter throughout the specification.

In the drawings:

Figure 6 is an end elevational view of the body partly in section with the floor removed, and showing a roller axle and the truck tracks;

Figure 7 is a perspective view, partly broken away and partly in section, of the rear end of the body and trailer;

Figure 8 is a diagrammatic view of the elevator with a van mounted thereon and showing in section the stern of a ship;

Figure 9 is a diagrammatic showing of one end of a truck, the elevator and a railway flat car;

Figure 10 is a diagrammatic view of a van, the elevator and warehouse or freight yard trackage; and Figure 11 is an enlarged detail view of one of the rollers of the van with elevator trackage therefor shown in section.

Figure 1:
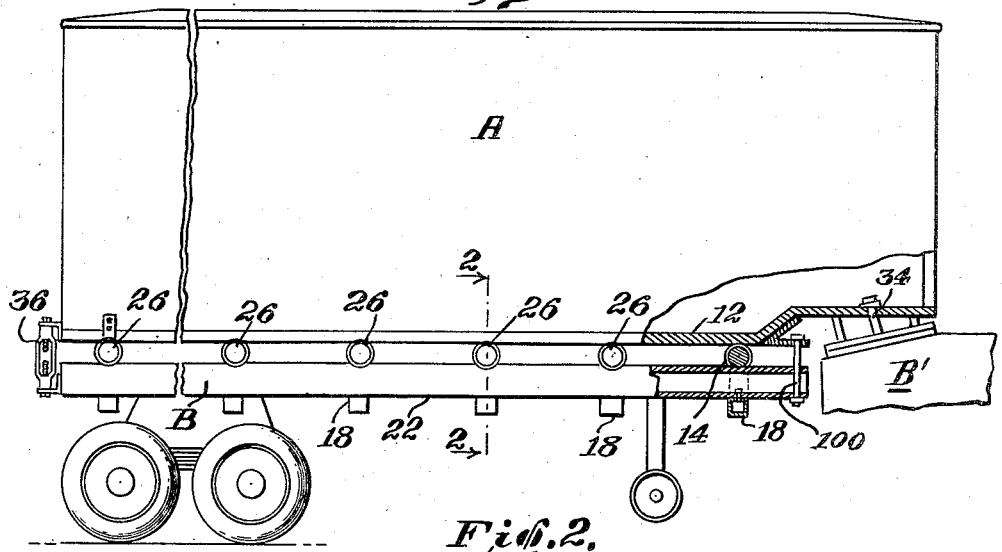
Figure 1 is a side elevational view of a trailer and load-carrying unit or body, both partly in section and partly broken away, taken from the opposite side of that shown in Figures 8, 9 and 10.

The transportation of motorized vehicles on railway cars and on floating craft is not a newly conceived practice or art; indeed, the practice is expanding within the limits imposed in attempting to successfully and economically load and carry the entire vehicle. In some few instances, the van or body only is transferred from a truck chassis to a railway flat car with the aid of a large "fork-lift." In most instances, the truck or truck-trailer is loaded upon a flat car by the power unit of the vehicle, all of which is transported by the flat car, except in the instance of a truck-trailer whose power unit only is detached after the loading of the trailer for transport.

This method of transporting such trucks and trailers by railway cars has serious and dangerous disadvantages due largely to the excessively high meta-centric height of the total heights of the flat car platform and its appurtenances, and because of the fact that the truck or truck-trailer, complete with its lading and its heavy highway wheels and other appurtenances is of comparatively great height. The greatest danger to such shipments and, indeed, to the entire railway train and its crew is experienced when the stability of the railway car or cars, each having a high center of gravity, ladened with such trucks or truck-trailers, is disturbed on curves of the railway track. Unless curves are traversed at a lower speed, therefore, the excessively elevated meta-center height of the car or cars, together with the trucks or truck-trailers resting on their highway wheels on such cars, become subject to derailment.

Because of limited overhead clearances of a substantial number of even class one type of railways in the United States, railway flat cars ladened with such trucks or truck-trailers, are not accepted for transport to destinations beyond interfering clearances.

Several commercial ship and/or barge operators are transporting in limited numbers trucks and truck-trailers on the decks of such floating craft. The transportation by ship of ladened and unladened railway cars has been practiced for some years. The railway cars to be transported are placed on an elevator equipped with rails to which they are secured. They are then elevated, one at a time, to a position above the rail of the ship, are moved latterly to a position over the ship's hatch and are then lowered to the deck of the ship for stowage. They are similarly unloaded at their destination.

It has been observed that the tare weight of railway cars almost equals the revenue paying weight of its contents.

Referring to the drawings, A is the van or load-carrying body; B' is the pneumatic-wheeled truck and B is the truck-trailer; C is the elevator; D is the ship; E indicates the railway rolling stock illustrated as a flat car in the drawings; and F is the freight yard or warehouse.

As will be noted hereinafter, the van or load-carrying body A may be transferred, either fully loaded or empty, onto any one of the other transporting means B, C, D, E, or F, or vice versa, or from one to the other of them, by moving the van in a horizontal direction, viz., no inclined surfaces are necessary incident to the transfer of the van from one or the other of the said transporting means.

As shown in several of the figures, the van A has a plurality of vertical sides 10 and a floor 12. Extending transversely of the floor are a plurality of spaced bearings 14, as seen particularly in Figure 2. These bearings are fastened to the floor in any suitable manner, and are illustrated as connected to the said floor by means of pins or bolts 16.

The truck not shown or truck-trailer B is provided with a plurality of transverse frame pieces 18, each of which is provided with several depressed portions 20 for the reception of the longitudinal tracks 22. These tracks are held in fixed position in the depressed portions by pins or bolts 24, although they may be held in position by welding or other suitable fastening means.

Figure 2:
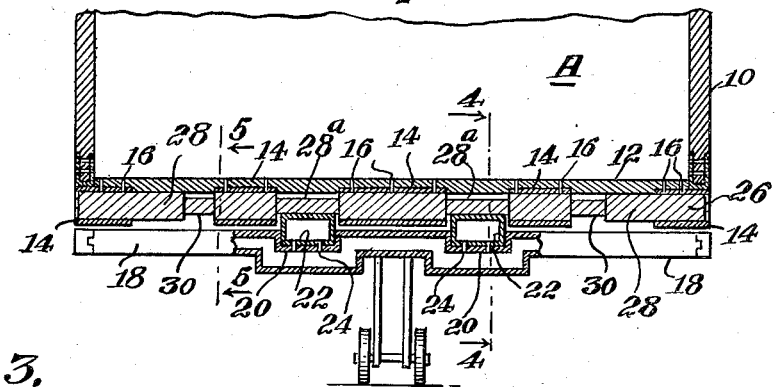
Figure 2 is a vertical section partly broken away on the line 2—2 of Figure 1.
Figure 3:
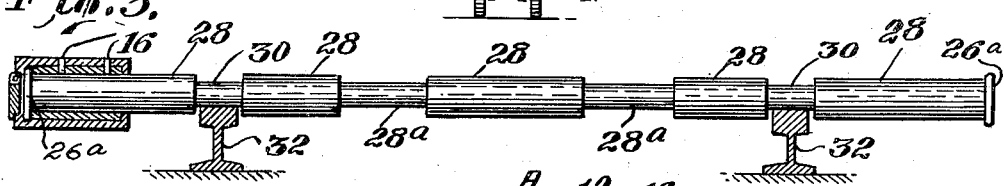
Figure 3 is an enlarged detail view showing one of the load-carrying axles or rollers, one bearing and the tracks therefor being shown in section.
Figure 4:
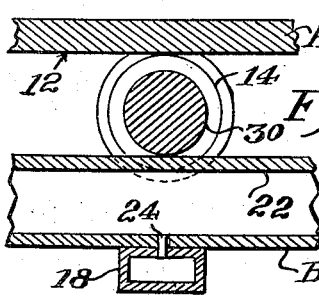
Figure 4 is a vertical sectional view on the line 4—4 of Figure 2.
Figure 5:
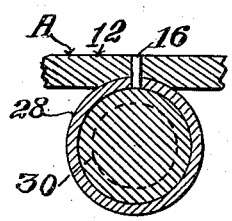
Figure 5 is a vertical sectional view of the floor and of the bearing and roller on the line 5—5 of Figure 2.

As shown particularly in Figures 2 and 3, the numeral 26 indicates a roller axle having enlarged ends 26a. A plurality of these axles are used and they are preferably closely spaced with relation to each other. Each axle is provided with enlarged bearing portions 28 which are engaged by the bearings 14, and reduced diametered portions 30 which preferably form the rolling surfaces when the van is moved onto and supported by railroad rails 32 or rails 32a, 32b and 32c, as set forth hereinafter. However, as the van is transferred to or from said rails onto the truck or truck-trailer, the intermediate bearing surfaces 28a are utilized to roll upon the truck or trailer tracks 22. The van is provided with conventional pivotal fastening means 34 whereby it may be connected to the cab section of the truck. The van is prevented from unauthorized rolling on the trailer or truck body by a plurality of spaced fastening members 36 which, as shown, are turnbuckles, and by the bolt 100. These turnbuckles must be loosened and the bolt removed before the van can be rolled off the truck, and they are applied when the van has been rolled onto the truck or the truck-trailer.

Reduced diametered portions 30 of the roller axle and intermediate reduced portions 28a thereof enable the van or load-carrying body A to be used on tracks of different gages.

The elevator C, ship D, and freight car E, are provided with rails or tracks 32a, 32b and 32c, respectively. These may be identical in shape and rails 32a, 32b and 32c are of the same gage, i. e., standard railroad gage, as are railroad rails 32, and consequently, all of them are engaged by the recessed portions 30 of the roller axle 26, rails 32a only being shown in Figure 11. Tracks 22 on the truck or truck-trailer B are preferably of narrower gage and these are engaged by the intermediate bearing surfaces 28a of the roller axle 26.

While the van may roll directly onto another surface of the same height as the floor of the truck without the use of an elevator, provided the levels of the tracks of each are substantially the same, usually an elevator C is used. The van turnbuckles 36 are released and bolt 100 and king bolt 34 are removed when the destination has been reached and the van or body is rolled into the elevator, suitable temporary fastening means such as chucks or brakes (not shown) being used to hold the van in proper position on the elevator.

During truck transportation, the truck pulls the body A which is bolted to the trailer at 100, pivoting of the chassis and van being permitted by king bolt 34. Therefore, the pulling force comes from the truck through the body to the trailer.

As shown in Figure 8, the ship D is provided with a plurality of decks 38, 40 and 42, each of which is provided with a pair of rails 32b extending lengthwise of the ship. Each of the railway cars is also provided on its upper surface with a pair of rails 32c and the elevator C is also provided with a pair of rails 32a, as seen in Figures 7, 8, 9 and 10. It will be understood that a plurality of elevators (not shown) may be arranged side by side so that each of them may align its tracks with a separate set of tracks for freight cars on side by side pairs of tracks in the freight yard or warehouse F of Figure 10. It will also be understood that a plurality of elevators may be arranged side by side for the structure shown in Figure 8, so that a plurality of parallel pairs of parallel tracks may be arranged on each deck of the ship shown in Figure 8.

The rear of the ship may be provided with a pivoted ramp, not shown, to connect the tracks 32a of the elevator to the tracks 32b of the ship.

Referring to Figure 8, the elevator, which is diagrammatically illustrated, may be of any conventional type, and the raising and lowering of the platform 50 thereof may be controlled by a manual valve operating means shown at 46 in Figure 8. A manual control means 48 is shown in Figure 9 for controlling the up and down movements of the platform 50a, and manual control means 52 may be used to control the up and down movements of the platform 50.

The platform 50a of Figure 9 may be properly adjusted vertically so that its tracks will be level with the tracks of the truck trailer B. After the van A is transferred to the platform, the latter may be adjusted to be level with the tracks of the freight car E, or in the event it is desired to transfer the van directly onto the tracks 32, the elevator is lowered until the platform is level with tracks 32, after which the van A is transferred to the tracks. The purpose of the elevator, as will be apparent in all of the constructions shown in the several figures, is to bring the elevator to the level of the transporting means, whether this consists of a trailer, railroad, flatcar, ship, etc., then to raise or lower the elevator platform with the van thereon to the exact level of the transporting means to which it is desirable to transfer the van. This latter may consist of a ship deck, railway flat car, rail tracks, aircraft, or other means of transportation, or the tracks of a freight yard or other trackage arrangement.

The instant transporting means for the movement by land, air and water of commodities, makes it possible to carry the goods partly by land, water, or air without unloading the containers or vans in which the goods are packed. In other words, the goods may be loaded into the van, which is retained in fixed position by the turnbuckles 36 and bolt 100 on the truck B at the factory and from there transported to a rail head or a ship and separated from the truck when it is desired to transfer the van to another form of transportation. The vans may then be carried for some distance on the railroad or ship, after which they again can be transferred to a truck and carried to their final destination, thus assuring only one loading and one unloading operation of the vans. A plane, not shown, may be substituted for any one of the instrumentalities, B, D, E, or F, the plane fuselage being provided with longitudinal rails corresponding to the rails 22 or 32.

The cost of transportation and especially the cost of distribution of commodities of all classifications transportable by trucks or truck-trailer vans, as a unit, or sectionalized, is materially reduced by the use of the present invention. The invention also increases the "earning time" of expensive rolling stock, motor trucking equipment, and commercial and military self-propelled ships and aircraft. This is due to the fact that many loading and unloading operations are eliminated and also because it is possible to use the entire loading capacity of a ship without the use of elevators and other transfer equipment in the ship for moving the vans from one deck to another thereof. Heretofore, the greatest disadvantage of shipboard transportation of trucks and truck-trailers, according to the Maritime Cargo Transportation Conference of the Division of Engineering and Industrial Research, and the Division of Vehicle Science, National Academy of Science, and the National Research Council of the United States Government, is the loss of in-ship density of loading, resulting from the current necessity of transporting the truck or truck-trailer van or body, together with the other portions of the truck, including the cab, motor and highway wheels, and the engine, and other appurtenances thereto. One-quarter to one-third of the ship cargo capacity must be sacrificed due to the necessity of transporting trucks and truck-trailers complete, with vacuum brakes, motor, cab, etc., and accessory equipment, and their large and heavy place-consuming highway wheels.

The present invention makes it possible to eliminate these large wheels and the motor and other parts of the truck from the ship, freight yard or warehouse, or other storage facility and from the railway car.

As distinguished from all such means of transportation, the present means for the transportation and storage of goods makes it possible to store or to transport only the van or truck body itself, supplemented by the spaced rollers 26 which form a part thereof and which enable the van or body to be transferred from one conveying or elevating means to another.

The above description and drawings disclose a single embodiment of the invention, and specific language has been employed in describing the several figures. It will, nevertheless, be understood that no limitations of the scope of the invention are thereby contemplated, and that various alterations and modifications may be made such as would occur to one skilled in the art to which the invention relates.

I claim:

1. A transportation system for transporting initially laden cargo from point of origin to destination comprising, a primary transporting means, a secondary transporting means, an elevator, a roller-borne carrier for said initially laden cargo carryable on each said transporting means and elevator in succession, fixed tracks on each said transporting means and elevator, said elevator being interposed between said primary and secondary transporting means when each is in position for transfer of said carrier from one transporting means to the other transporting means, with all said tracks extending in the same direction at the time of transfer, said roller-borne carrier comprising a body including a pair of longitudinal side walls and a floor connected thereto providing a space for said cargo, bearings supporting said side walls and floor, a plurality of roller axles of relatively small radii spaced longitudinally of said body and supported in said bearings, said axles extending substantially from one to the other of said side walls, said roller axles having cylindrical portions of track matching gauge for engaging the tracks on said primary and said secondary transporting means and said elevator in succession, when both said transporting means and said elevator are in said position for transfer of said carrier from one transporting means to the other transporting means.

2. A transportation system for transporting initially laden cargo from point of origin to destination comprising, a primary transporting means, a secondary transporting means, an elevator, a roller-borne carrier for said initially laden cargo carryable on each said transporting means and elevator in succession, fixed tracks on each said transporting means and elevator, said elevator being interposed between said primary and secondary transporting means when each is in position for transfer of said carrier from one transporting means to the other transporting means, with all said tracks extending in the same direction at the time of transfer, said roller-borne carrier comprising a body including a pair of longitudinal side walls and a floor connected thereto providing a space for said cargo, bearings supporting said side walls and floor, a plurality of roller axles of relatively small radii spaced longitudinally of said body and supported in said bearings, said axles extending substantially from one to the other of said side walls, said roller axles having cylindrical portions of different radii than the portions thereof engaging said bearings, and of track matching gauge for engaging the tracks on said primary and said secondary transporting means and said elevator in succession, when both said transporting means and said elevator are in said position for transfer of said carrier from one transporting means to the other transporting means.

3. A transportation system for transporting initially laden cargo from point of origin to destination comprising, a primary transporting means, a secondary transporting means, an elevator, a roller-borne carrier for said initially laden cargo carryable on each said transporting means and elevator in succession, fixed tracks on each said transporting means and elevator, said elevator being interposed between said primary and secondary transporting means when each is in position for transfer of said carrier from one transporting means to the other transporting means, with all said tracks extending in the same direction at the time of transfer, said roller-borne carrier comprising a body including a pair of longitudinal side walls and a floor connected thereto providing a space for said cargo, bearings supporting said side walls and floor, a plurality of roller axles of relatively small radii spaced longitudinally of said body and supported in said bearings, said axles extending substantially from one to the other of said side walls, said roller axles having cylindrical surfaces of reduced radii of track matching gauge for engaging the tracks on said primary and said secondary transporting means and said elevator in succession, when both said transporting means and said elevator are in said position for transfer of said carrier from one transporting means to the other transporting means.

4. The structure of claim 1 wherein said bearings include a bearing located beneath each side wall, and a bearing located between the track engaging portions of said roller axle.

5. The structure of claim 3 wherein said secondary transporting means comprises a ship.

6. The structure of claim 3 wherein the primary transporting means comprises a truck means.

7. The structure of claim 1 wherein said primary transporting means comprises a truck and said secondary transporting means comprises a flat car.

8. The structure of claim 3 wherein said primary transporting means comprises a truck and said secondary transporting means comprises a ship.

9. The structure of claim 3 wherein said primary transporting means comprises a truck-trailer and one of said bearings comprises an intermediate bearing supported directly by said floor.

References Cited in the file of this patent

UNITED STATES PATENTS

| | | |
|---|---|---|
| 709,210 | Eagen | Sept. 16, 1902 |
| 1,354,688 | Rice | Oct. 5, 1920 |
| 1,581,746 | Kellett | Apr. 20, 1926 |
| 2,004,095 | Hankins et al. | June 11, 1935 |
| 2,096,958 | Clerc | Oct. 26, 1937 |
| 2,451,198 | Burke | Oct. 12, 1948 |
| 2,715,969 | Olsen | Aug. 23, 1955 |
| 2,715,971 | Cox | Aug. 23, 1955 |